July 25, 1967
N. C. AMEN
3,332,287
DEVICE FOR MEASURING FLUID PRESSURE
Filed Dec. 12, 1966
3 Sheets-Sheet 1
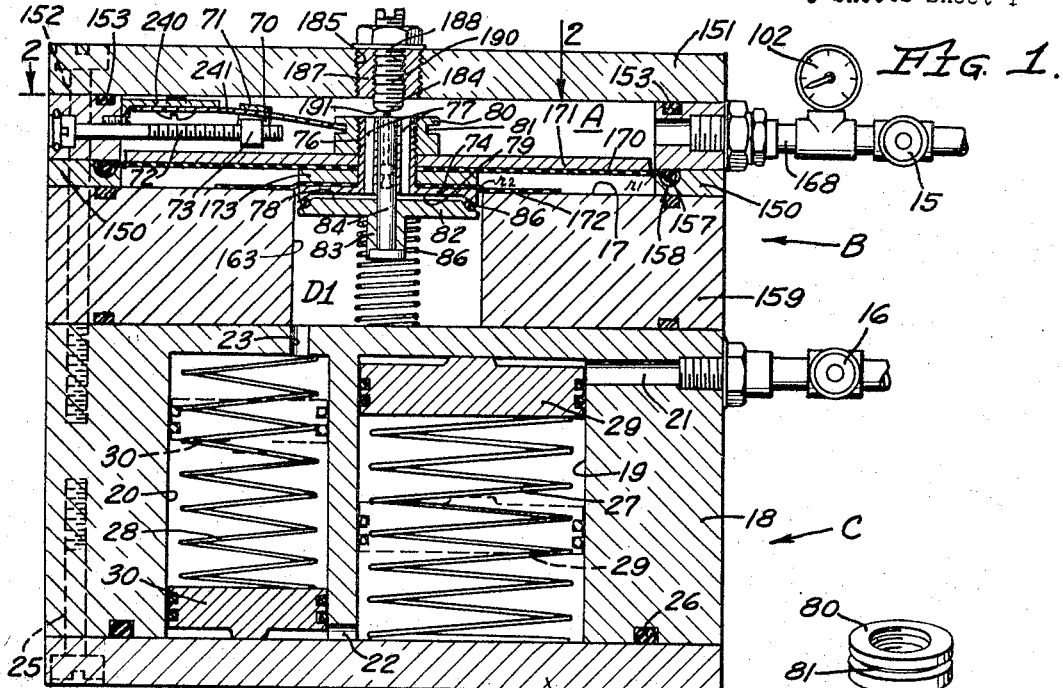
FIG. 1.
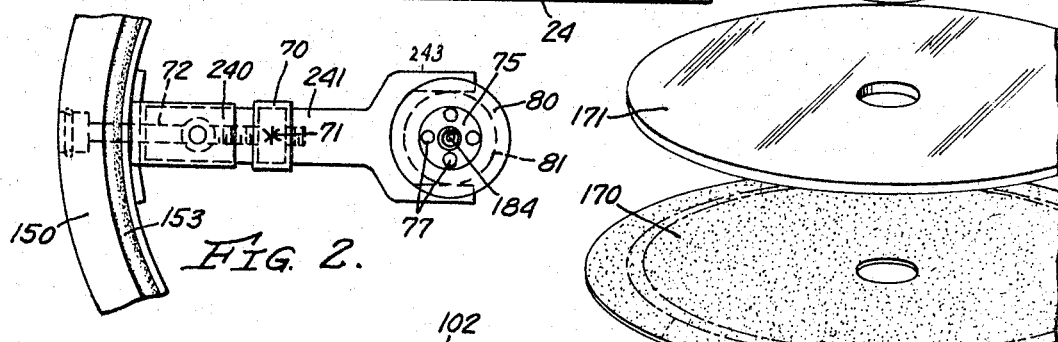
FIG. 2.     FIG. 9.
FIG. 10.     FIG. 11.

July 25, 1967

N. C. AMEN 3,332,287

DEVICE FOR MEASURING FLUID PRESSURE

Filed Dec. 12, 1966

INVENTOR.
NICHOLAS C. AMEN,
By Howard L. Johnson
ATTORNEY.

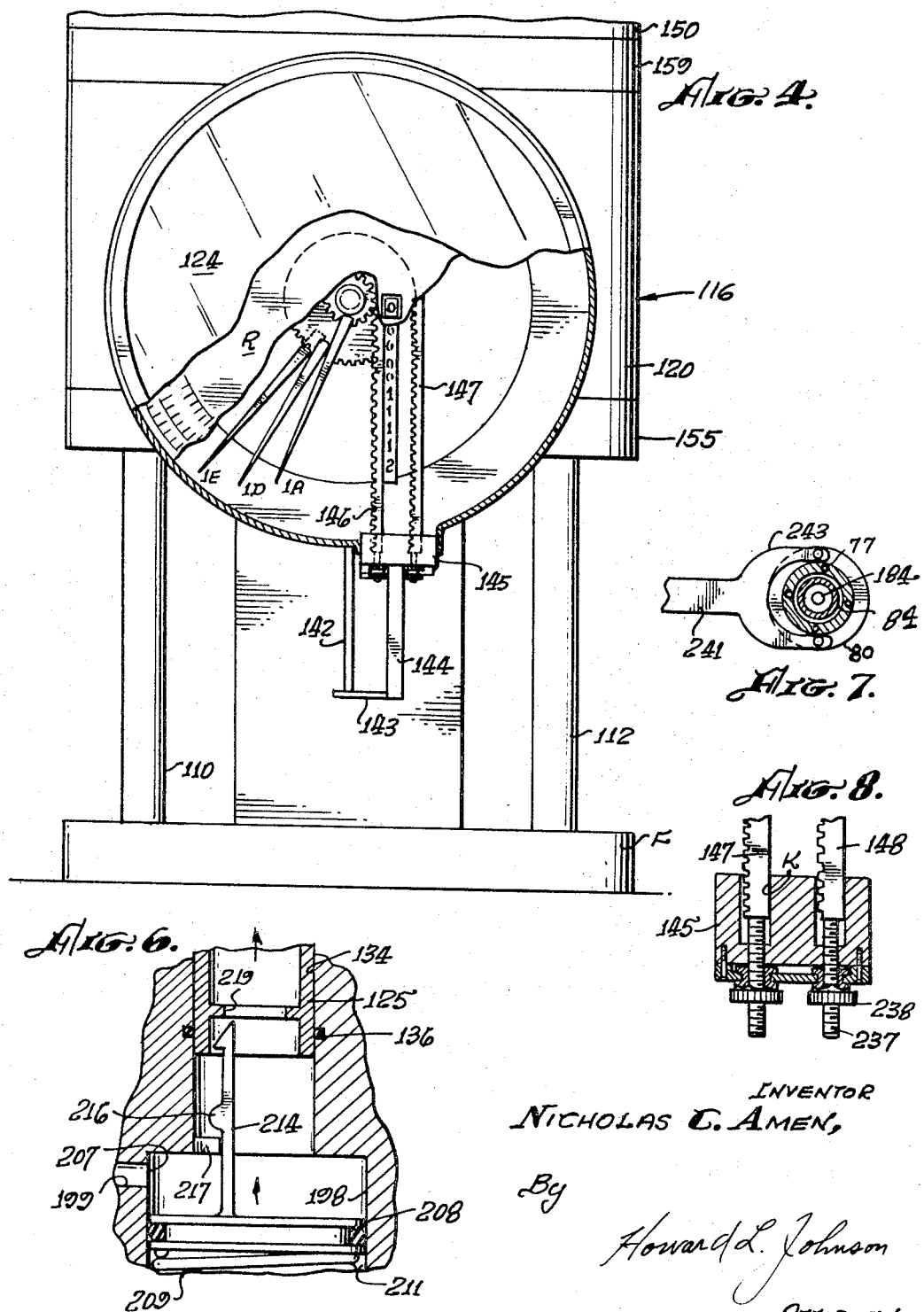

United States Patent Office 3,332,287
Patented July 25, 1967

3,332,287
DEVICE FOR MEASURING FLUID PRESSURE
Nicholas C. Amen, 318 W. Colorado St.,
Glendale, Calif. 91204
Filed Dec. 12, 1966, Ser. No. 601,044
18 Claims. (Cl. 73—419)

ABSTRACT OF THE DISCLOSURE

Ultra-high pressures of fluids are accurately measured with a low pressure gage by interposing between the fluid and gage (one or more) containers having a mutually balancing and valve-connected pair of respective high and low pressure gas chambers of reciprocally variable volume which are separated by a pair of juxtaposed diaphragms of dissimilar areas which form walls of the respective chambers and, when unflexed, balance the unequal pressures in a ratio equal to their effective chamber wall areas. The juxtaposed diaphragms are traversed by a two-way valve which transfers gas between the two chambers in response to diaphragm movement in either direction, so as to maintain the constant pressure ratio between the two unequal volumes of gas. The unknown ultra-high pressure which is connected to the high pressure chamber is learned by multiplication of this constant area-pressure ratio times the gage-measured pressure in the low-pressure chamber.

Background of the invention

This is a continuation-in-part of my application, Ser. No. 541,646, filed Apr. 11, 1966, now abandoned, which is a continuation-in-part of my application, Ser. No. 317,962, filed Oct. 22, 1963 (now Patent No. 3,245,323, issued Apr. 12, 1966).

In the first application there was disclosed a friction or load testing device for evaluating combinations of bearing substances together with selected lubricants associated therewith under various test conditions of rotational speed, temperature, etc. In particular, the variable pressure or load applied to the test piece by means of an assembly of nested, cascade-valved bellows which were operated typically by compressed air, could be progressively increased in small calibrated amounts so as to more accurately ascertain the narrow pressure range at which the observed bearing failure occurred; the fail pressure could then be more precisely determined by means of a pressure-dividing or fractionating unit which in effect separated a small aliquot of the applied high pressure, so that this known fraction of the total pressure could be more accurately determined by a low pressure gage. The total pressure being applied was accordingly the corresponding multiple of the gaged aliquot.

The second, as well as the herein application provides a more versatile fluid-pressure dividing or balancing unit which can be used, for instance, with the noted load testing device which employs increasing high pressure, as well as for other diverse purposes, including determinations of decreasing high pressure, such as metering decreasing pressurized supplied of rocket engine fuel, etc. More particularly it can be used to measure high pressure liquids (by balancing them against lower gas pressure in my device), as well as to measure high pressure gases with much greater accuracy and precision than previously possible. In particular, such result has the accuracy of low pressure gages as currently used for low pressure determinations.

In comparison, currently available commercial pressure-testing devices typically employ a Bourdon tube which is an elliptical cross-sectioned semi-circular tube having a closed, free end, and a fixed open end connected to a pressure system, the variations of pressure therein altering the bowing or longitudinal deflection of the tube. Such tubes are formed with specialized shapes adapted to different pressure ranges, e.g. relatively flat for low pressure, relatively round for higher pressure, multicoiled for above 40,000 p.s.i. However, outside its intended and limited range the tube may be bent in use beyond its elastic limit and have to be discarded; or if such distortion is not realized at once, it may continue in use with resulting erroneous indications.

Summary of the invention

The present device is based on a pair of coupled, face-to-face diaphragms, such as detailed in my earlier application S.N. 317,962, which diaphragms have different surface areas of predetermined ratio and are disposed as juxtaposed walls in adjacent chambers of respective low and high pressures, which unequal pressures are balanced against each other (when the coupled wall-diaphragms are unflexed) in the same ratio as that of the surface areas of the paired diaphragms which are exposed in the respective chambers of which they form respective walls. Thus when the pressure in one gas chamber is known (that is, determined by a gage), the corresponding pressure in the adjacent chamber can be calculated by use of the known ratio of diaphragm areas. This permits the more precisely determinable low pressure measurements to be multiplied by such ratio in order to determine the balancing high pressure.

There is additionally added to this construction an internal support unit to sustain the weight of the pair of diaphragms and backup plates and their axial coupling and valve assembly, thereby increasing the sensitivity of the diaphragms to smaller changes or fluctuations in pressure within a chamber. Further, a two-way valve unit is provided in conjunction with the coupled diaphragms.

In one embodiment, there is incorporated a fluid-(desirably liquid-) operating piston, characterized by a larger end face disposed within said high pressure gas chamber and positioned for a compression stroke in opposition to said coupled diaphragms, and having a smaller end face exposed to application of an unknown ultra-high pressure which is to be measured. The force of the ultra-high pressure is thus reduced in its application to the diaphragmed chambers in proportion to the ratio of the areas of the unequal end faces of the piston. At a final equilibrium position or end of stroke, the pressure in the lowest gas pressure chamber (although somewhat increased) can still be determined accurately by a conventional gage; by multiplying this by the known diaphragm and piston-surface areas ratios, the pressure of the ultra-high pressure fluid which was applied to the small end of the piston can be obtained. Thus (stepwise), if the low pressure gas chamber has 15 p.s.i. and the diaphragm ratio is 16:1, the balancing high pressure gas chamber will be 240 p.s.i. Then if the operating piston has end faces of 5/8 in. and 3 inch diameter, their area ratio is approximately 23:1. Multiplying 23 by 240 yields 5520 p.s.i., which is the unknown ultra-high pressure at the small piston face which is distally balanced by 15 p.s.i. in the low pressure gas chamber. This 15 p.s.i. can be very accurately measured by present gages; if desired a mercury manometer can be used.

Alternately, a number of the dual-chamber, gas pressure balancing units may be connected together in tandem or series, so as in effect to divide the unknown ultra-high pressure several times (that is, by the successive diaphragm area ratios) before its last aliquot is finally gauged at the last low pressure chamber. In this connection, there is provided gage- and valve-protection means embodied in a safety chamber at the high pressure inlet side which blocks further pressure increase above a predetermined amount. Also, means are provided, typically within the low pressure chamber (which is the larger of the dual balancing chambers), to increase the sensitivity of the diaphragm action—that is, to make the valve action responsive to a minimum diaphragm flexion or pressure unbalance in either chamber—by way of externally adjustable suspension of the weight of the coupled diaphragms, backup plates and axial valve assembly. The triggering abutment surface for the valve which vents into the low pressure chamber is also externally adjustable.

Other objects and advantages will become apparent as the description proceeds.

Description of the drawings

In the accompanying drawings which illustrate by way of example, several presently preferred embodiments of the process and structures of my invention:

FIGURE 1 is an axial sectional view of one of my gas pressure balancing units, shown connected to a low pressure gage, with some structures appearing in elevation;

FIGURE 2 is a fragmentary plan view of the yoke suspension assembly as seen along the line 2—2 of FIG. 1;

FIGURE 4 is a partial, front elevational view of the device as viewed along the line 4—4 of FIGURE 3;

FIGURE 6 is a fragmentary, generally axial sectional view of the lower end of the operating piston, showing the latch head of the zero retraction unit in disengagement therefrom;

FIGURE 7 is a transverse sectional view through the end of the valve housing, showing the end of the suspension arm in plan view, as seen along the line 7—7 of FIGURE 3;

FIGURE 8 is a detail of the rack-holding tray and adjacent structure similar to that of the left side of FIGURE 3, in vertical transverse section;

FIGURE 9 is an exploded perspective view of the several elements of the two-way valve assembly of FIGURE 1;

FIGURE 10 is a schematic view of three of the gas pressure balancing units of FIGURE 1, connected in tandem;

FIGURE 11 is an elevational view of an adjustable leverage connection in the intermediate linkage which transmits movement of the operating piston to the rack and pinion indicating means, which leverage can be used in place of the unlevered linkage shown in FIGURE 3.

Description of one preferred embodiment

Figure 3:
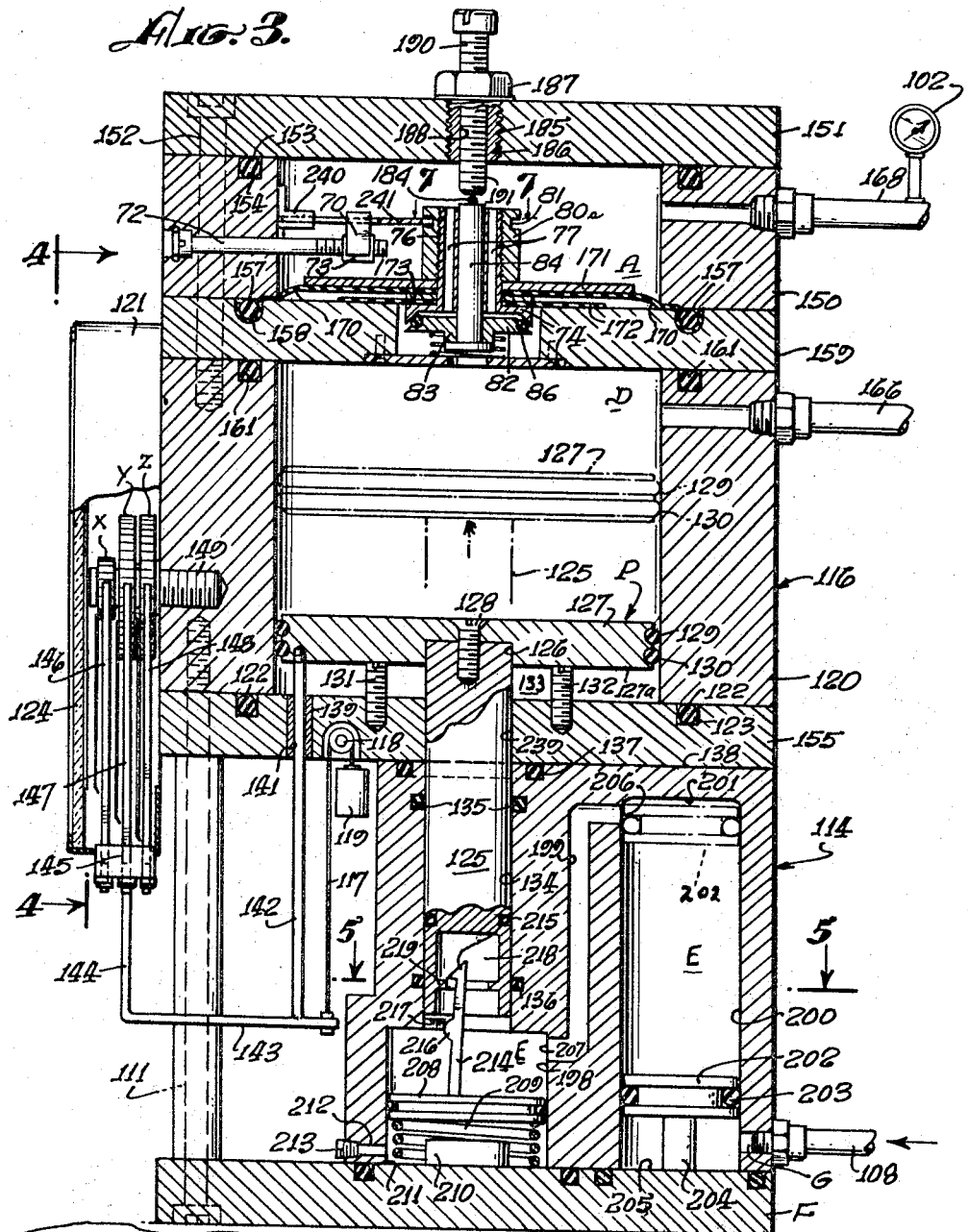
FIGURE 3 is a vertical, generally axial sectional view of a composite embodiment of my fluid pressure measuring device which incorporates one of the balancing units of FIGURE 1 plus a piston-type pressure balancing unit in sequence therewith, some parts appearing in elevation, the operating piston being seen in its fully retracted or rest position, plus (in phantom lines) in compression stroke.
Figure 5:
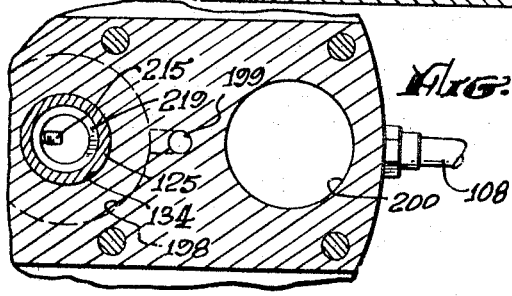
FIGURE 5 is a fragmentary, transverse sectional view taken along the line 5—5 of FIGURE 3, showing the two portions of the operating liquid supply chamber of the lower housing block.

My pressure balancing unit B (FIG. 1) in its simplest form provides a low pressure gas chamber A and an adjacent, valve-connected, high pressure gas chamber D1 (or D of FIG. 3) of much smaller volume. The low pressure chamber A is directly connected to a low pressure gage 102 by a conduit 168, by means of which the unit B may be vented and initially charged, as with compressed air, by connection through the valve 15. The high pressure chamber D1 is in connection with the source of unknown high pressure, either directly through an inlet valve 16 or through the intermediary of one or more other gas balancing units (FIGS. 3 and 10).

Cylindrical housing for the pair of balancing chambers A and D is provided by a top or end plate 151, a tubular body 150, and a centrally apertured plate 159 of which the axial aperture 163 forms the chamber D1, the sandwiched layers being fastened together by bolts 152 and sealed with O-rings or gaskets 153, 157.

A dual-chamber pressure-limiting or blow-out preventive unit C may be secured to the high pressure chamber end of the balancing unit B. It consists of a tubular housing 18 having two side-by-side parallel longitudinal chambers 19, 20 formed therein, and flow-connected by a transverse duct 22, which together with the opposite-end passages 21 and 23 forms a high pressure path from the inlet valve 16 sequentially through the passage 21, larger chamber 19, duct 22, smaller chamber 20, and exit passage 23 into the high pressure chamber D1. And end plate 24 forms a joint wall for the dual chambers 19, 20, being tightly secured by a circle of bolts 25 and sealing O-ring 26. In each of the dual chambers there is a compression spring 27, 28 each located on the downstream side of a free-floating piston 29, 30. It will be seen that when incoming pressure displaces the larger piston 29 along its chamber 19 for much less than the chamber length, it has displaced the smaller piston 30 for the whole length of its chamber 20, thereby closing the passage 23 and stopping further increase of pressure in the balancing unit B. This protects the low pressure gage 102 from possible rupture by any sudden surge of ultra-high pressure; it also protects the two-way valve assembly which is located between the balancing pressure chambers A and D1. Further, should the larger piston 29 be driven the entire length of its chamber 19, it would then block the duct 22.

Adjacent walls of the low and high pressure chambers A and D are formed by juxtaposed flexible diaphragms 170, 172, which are tightly affixed about their outer perimeters, respectively, to the O-ring groove 158 and to the upper face 17 of the housing plate 159. Each diaphragm is in planar registration with a backup plate 171, 74 in its respective chamber, and the two face-to-face or juxtaposed diaphragms are separated by a spacing disk 173. It will be seen that each backup plate is somewhat less than the cross-sectional area of its respective chamber, and the narrow annular area ($r$) between its perimeter and the surrounding chamber wall is the flexion area of each diaphragm. The latter is intended to move only a very small axial distance in triggering the particular one of the unidirectional valves to transiently open, that is, a flexion on the order of $\frac{1}{16}$ inch or less. There is accordingly only a very small fold or annular ripple $r1$, $r2$, provided in the mounted diaphragm which may be formed of heavy rubberized fabric or metallic material. Also, such small "crease" does not enter into the measurement or calculation of the effective wall-surface area of the diaphragm which is taken as equal to the planar cross-sectional area of the cavity which it spans, which in each case is a cylindrical chamber.

Plate 74 is formed with a tubular stem 75, terminally threaded at 76 and longitudinally drilled at 77. The unthreaded portion of stem 75 fixedly traverses the two diaphragms 172, 170, the spacer 173 and the backup plate 171, and its threaded end then receives a peripherally edge-grooved nut 80. A spring-metal, bifurcate-ended suspension arm 241 is received in the groove 81, with its opposite end secured to a mounting bracket 240. Bowed suspension position of the arm 241 is externally adjustable by means of a screw 72 having a stirrup 70 fixed at 71 to the spring arm and carried by a nut 73 which is threaded on the screw 72. Rotation of the latter moves the nut 70 lengthwise to the screw so as to angle the sirrup in one direction or the other.

Adjacent the high pressure side 79 of the smaller backup plate 74 is a complementary-faced disk 82 having an axially projecting tubular hub 83 within which is fixed a cylindrical-housed valve 84 with its projecting valve stem 184 extending into the low pressure chamber A. The valve stem 184 is in line to abut—upon upward flexing of the coupled diaphragms, that is, upon overbalance of pressure in chamber D—against the end 191 of an axial adjusting screw 190 which is threadedly mounted in the tapped bore 188 of a threaded bushing 187 which is located in the bore 185. Opening of the valve 84 passes gas from chamber D to A, causing unflexing ($r1$, $r2$) of the diaphragms, thus withdrawing the valve stem from abutment with the screw end 191, and closing the valve.

The elements of the two-way composite valve assembly which allows passage of gas in the opposite direction is the disk 82 of which the face 78 is always exposed to the low pressure of chamber A through the passages 77. A sealing O-ring 86 carried by a beveled perimeter of the disk 82 is normally held in frictional engagement with the plate 74 by a compression spring 86. In effect, the complimentary-faced disks 74, 82 can be considered as a single backup plate (for the diaphragm 172) which cylindrical plate has been diametrically split. Overbalance of low pressure in chamber A will move the coupled diaphragms 170, 172 (by pressure on 170) toward the high pressure chamber D1, and also (by pressure on surface 78) move the valve disk 82 to overcome the spring tension of 86 and separate from the disk 74 so as to pass gas from chamber A to chamber D1.

The balancing unit B may be operated with its longitudinal axis disposed generally vertical, as shown in FIGS. 1 and 3. Or the axis may be disposed generally horizontally and the suspension arm 241 will still serve to balance the weight of the central valve assembly plus the diaphragms and backup plates.

With reference to the embodiment of my invention seen in FIGURES 3–8, essentially there is again provided a mutually balancing pair of pressurized gaseous or compressed-air chambers A and D, and a liquid fluid supply or operating chamber E which is separated from the coupled chambers A and D by an operating piston P and adapted at its entry port G for selective attachment to a source of ultra-high fluid pressure which is to be measured. This latter fluid of unknown pressure can be either gaseous or liquid. At the finally balanced state of the device, the pressures of the respective chambers A, D and E (that is, corresponding to the lines 168, 166 and 108) are indicated by respective pointers or indicators 1A, 1D and 1E on a readout dial R as more fully explained elsewhere herein.

Structurally this device embodies a generally horizontal base or footing slab F from which a pair of upstanding, front posts 110, 112, and a rear casting or housing block 114, jointly support across their tops an upper housing structure 116, secured by bolts 111 or the like. Within the housing 116, an upper chamber A is formed by a generally cylindrical tubular segment 150, having an end plate 151 secured by bolts or screws 152 and sealed by a resilient gasket 153 which is disposed in a generally annular groove 154 in the upper end face of the segment 150. Chamber A is for low pressure gas, which may be a partial vacuum, and can always be read on a line gage 102.

Another cylindrical tubular body segment 120 of similar inner and outer diameters to the tubular segment 150 thereabove, defines the high pressure chamber D and is separated from the upper segment 150 by an axially apertured plate 159 which is disposed in sealing registration with the adjacent housing segments 120, 150 by annular gaskets 157, 161. Each chamber A, D is provided with a lateral gas-inlet line 168, 166 which traverses the respective segments 150, 120 for coupling to a suitable source of compressed air or the like, as well as to such gages as desired.

An axial aperture or recess 163 of the plate 159 is sealingly overlaid by a centrally apertured, flexible diaphragm 172, immediately above which is located in sequence, an intermediate spacer plate 173, another flexible diaphragm 170 which similarly may be of heavy cloth or other gas-impervious sheet material, and a backup plate 171. The outer periphery of the larger diaphragm 170 which thus spans (i.e., is coextensive with the sectional area of) chamber A, is lodged in an annular groove 158 together with the gasket ring 157.

The top housing plate 151 is axially tapped at 185, in which aperture the threaded stem 186 of a bushing 187 is located. An internally threaded bore 188 thereof engages an adjusting screw 190, the inner end 191 of which is thus disposed to abut the valve stem 184 upon movement of the control valve assembly caused by upflexing of the high pressure diaphragm 172 which has the effective area of the recess 163. This movement results from increase of pressure in chamber D in excess of the amount of high pressure in such area which is normally balanced by the low pressure of chamber A exerted against the greater area of diaphragm 170. The precise setting of the screw 190 or the positioning of its valve abutment end 191 can be readily adjusted as will be apparent.

The floor of the upper housing 116 is provided by a cross plate 155, carrying an annular sealing gasket 122 which is disposed in a corresponding open-top groove 123 in abutment with the cylindrical body segment 120. The floor plate 155 is axially apertured at 239 to slidingly receive a piston stem 125 of the operating piston P, the upper end of which stem is socketed in a recess 126 of a large-area piston head 127 and secured by an axial screw 128. The annular side of the head 127 carries a pair of sealing gaskets 129, 130, while its underface 127a intermittently abuts against a pair of spacing studs 132, 132 which project upward from the floor plate 155 on opposite sides of the piston stem so as to define a clearance or open space 133 between the floor plate 155 and the rested or fully-retracted piston head.

The lower end of the piston stem 125 is disposed in a bore 134 of the housing block 114, and provided with upper 135 and lower 136 annular sealing gaskets. An annular gasket 137 of greater diameter also seals the intersection 138 between the flooring plate 155 and housing block 114. The floor plate 155 is also transversely apertured at a forward location 139, spaced generally parallel to and radially outward from the axis, and containing a tubular bearing sleeve 141 which slidingly journals an upright rod 142. The rod 142 is fixedly dependent from the underface 127a of the piston head, and at its lower extremity is affixed to a horizontal arm 143 which forms part of an intermediate linkage connecting the moving piston to the indicating means. A forwardly located, upward projecting arm 144 supports a generally horizontally disposed tray or bracket ledge 145. Upstanding from open-top grooves K of the tray (FIG. 8) are three generally parallel, toothed racks 146, 147, 148, spaced outward from the upper housing 116 and in operative engagement with respective pinion wheels X, Y, Z, which are individually rotatable on an axle 149 and carry the respective pointers 1A, 1D, 1E. Within its groove K, each rack is supported atop a threaded shaft 237 which dependently carries a thumb nut 238 for vertical adjustment of the rack to its particular zero position relative to a calibrated dial R.

By the modification of FIG. 11, a leverage arm 143a is pivoted to the upright shaft 103 of a floor bracket 104, and the linkage arms 142a and 144a are pivoted thereto at selected locations 105, 106 to obtain the desired multiplication of the movement of the operating piston P as transmitted to one or more meshing rack and pinion, so as to indicate its displacement in a compression stroke.

In front of housing 116, a protective shield 121 with transparent face 124 overhangs the assemblage of racks, pinions and pointers. The dial R may be painted or otherwise inscribed thereon, or it may be in the form of a transparent, 360° disk bearing the necessary calibrations or indicia, such disk being juxtaposed to one face of the window 124. It will be apparent that the entire tray 145 and carried racks moves up and down in unison with the movement of piston head 127 within the chamber D (exposing the particular diaphragm ratio and piston face ratio); different gearing yields varied speed or amount of travel of the different pointers for the same linear displacement of the piston. The weight of such assembly is counter-balanced by a tare 119 hung by a cable 117 over a pulley 118 which is lodged in a recess of the underface of the floor plate 155.

The rear housing block 114 is formed with the piston-stem-housing bore 134 located axial to the upper cylindrical tubular segments 120, 150, and with its lower end radially enlarged at 198, which space, together with a laterally adjacent, upstanding cylindrical cavity 200 forms the operating or (liquid) fluid supply chamber E, the two portions being connected by a conduit 199. Within the anterior portion 200 of the chamber E, there is located a free-floating piston 202 which carries an annular sealing ring 203, and a dependent stop pin 204 disposed to abut the floor 205 of the cavity so as to always place the piston above the entry port G. The opposite or top end 201 of the cavity serves to halt the piston 202 at a limit position, blocking the post 206 of channel 199. Thus when the applied pressure in inlet line 108 is greater than the compression required to displace the free-floating piston 202 more than the length of the cavity 200, the application of such excess pressure to the subsequent passages and elements of the device is prevented by the piston 202 blocking the outlet 206. This prevents damage, for example, to the proximate elements which are located in the chamber portion 198.

Within the ultimate section 198 of chamber E, and below the entry port 207 of the incoming conduit 199, is located composite retraction means for automatically returning the operating piston P to zero position immediately prior to its extension displacement in a gas-compressing stroke within the chamber D; such retraction of the piston to zero is effected (following pressure release after a preceding determination, as by uncoupling the supply line 108) by the initial wave or surge of new (i.e., ultra-high) pressure from the supply line 108. Such retraction means include a piston-type anchor member 208 which is retained atop a coil spring 209, with an axially disposed stop 210 centered within the coil so as to provide a limit for downward displacement of the anchor 208 which is effected by the initial wave of incoming fluid pressure entering from port 207.

The sub-chamber 211 beneath the anchor 208 is charged with compressible fluid such as compressed air, by way of the line 212 which is then plugged as with a temporary closure 213. Such confined gas volume 211 acts in absorbing the primary shock of high pressure fluid which is released into the inlet line 108. Occasionally such fluids, and more frequently liquids, may prove corrosive to the apparatus or not readily miscible with earlier or subsequent liquids, so that a further protection is afforded the device by filling the entire chamber E—that is, the space between the posterior face of the free-floating piston 202, and the lower end of operating piston stem 125—with an inert liquid such as glycols or saturated hydrocarbons. Such inert or unreactive liquids are not appreciably effected by temperature or pressure changes.

Upstanding more-or-less centrally from the upper face of the anchor 208 is a somewhat resilient rod 214 formed with a latch head 215 at its free end. Intermediate its length is located a contact lug 216 which is alignable with a projecting finger 217 fixedly mounted at the mouth of the bore 134. The adjacent, small end of the piston stem 125 is formed with a downward-opening cavity 218 within which the latch rod 214 is receivable. An inward projecting, annular rib or engaging lip 219 within the cavity, provides an attachment for the latch head 215 which by the rod 214 is normally positioned for coupling when the rib 219 and latch 215 are at the same horizontal level. Such concurrence takes place when a relief of pressure in the inlet line 108 enables the piston head 127 to descend, and the anchor 208 is in its uppermost position. Upon the two being coupled together, a fresh surge of incoming pressure will first depress the anchor so as to pull down the piston stem 125 to zero position, at which engagement of the lug 216 and finger 217 will uncouple the latch head 215 from the rib 219 and release the operating piston P for another stroke.

With the device of FIGURE 3 itself, at the equilibrium position or end of the compression stroke of the operating piston P, the actual pressure in chamber A is first read on the gage 102. As before, the latter may even be a mercury manometer for greatest accuracy, or it may be a Bourdon tube which is effective at such low pressure, or any other available type gage may be used, depending upon its accuracy. Such reading (which may be caused to register on the dial R, either alone or as the product of the pair of ratios of diaphragms and piston areas) is the basis of the calculated pressure applied in chamber E. It will be realized that the pressure applied by line 108 at port G must be sufficiently greater than that of high pressure D, so that the aliquot (e.g., $\frac{1}{23}$) can effect a compression stroke of the larger head 127 against the already compressed gas in D. Expressed oppositely, however, this is the great advantage of the present device in that it can accurately ascertain this ultra-high pressure of chamber E, by way of precise measurement of the low pressure gas in chamber A. To repeat the earlier example: with a diaphragm ratio of 16:1 and a piston area ratio of 23:1, 15 p.s.i. in chamber A will balance 5520 p.s.i. in chamber E. And such result is obtained without hysteresis or other potential injury to the apparatus.

It will be apparent that diaphragms of different surface ratios and pistons of other surface areas can be used than those given here by way of illustration. Likewise, more than one pair of diaphragm-balanced gas chambers may be incorporated in such a device, together with the piston; and the terminal, measured low pressure may be so reduced as to be only a small vacuum if so desired. Various changes of construction and operation may be made within the present inventive concept, having in mind the substitution of functional equivalents within the ability of one skilled in the art, and therefore this disclosure is not intended to be limited by the precise details shown in the drawings and particularly described in the specification by way of example, but it is my intention to hereafter claim the invention broadly, aside from the limitations necessarily imposed by the prior art.

I claim:
1. The process for determining the unknown pressure of a fluid which is under elevated pressure, which process comprises:
   (a) maintaining at a known and constant ratio of pressures, a quantity of compressed gas which at such equilibrium state is kept divided into two variable portions of respective low and high pressure in accordance with said constant ratio, a change of pressure of either portion resulting in a transfer of some gas between said portions in a direction so as to restore and maintain said constant ratio of pressures;
   (b) balancing said unknown pressure against said high pressure portion and then at the resulting equilibrium state assumed by said two portions, determining the pressure of said low pressure portion of gas, whereby the unknown pressure of said fluid of elevated pressure may be calculated by multiplication of said low pressure with said constant ratio.

2. The process of the preceding claim 1, wherein a known aliquot of said unknown pressure is directly balanced against said high pressure portion.

3. The process of the preceding claim 1, wherein said fluid of unknown elevated pressure is a liquid.

4. The process of the preceding claim 1, wherein said fluid of unknown elevated pressure is a gas.

5. A gas pressure balancing unit of the character described, adapted to be interposed between a source of unknown high pressure and a low pressure gage, by means of which the low pressure gage can be used to accurately measure the amount of said high pressure including fluctuations thereof, said balancing unit including:

walls defining adjacent high and low pressure gas chambers, separated along a common plane, and associated conduit and coupling means for attaching respectively the high pressure gas chamber to said high pressure source and the low pressure gas chamber to said low pressure gage, juxtaposed areas of the high and low pressure gas chambers along said common plane being formed with a predetermined ratio which constitutes the balancing ratio of pressures of the two chambers, a pair of flexible diaphragms spanning said respective juxtaposed areas and located generally parallel to each other along said common plane, each forming a wall of one of said chambers, said diaphragms being coupled together for flexion in unison, two-way valve means functionally associated with said diaphragms and connecting said high and low pressure chambers, said valve means being operable responsive to movement of said diaphragms caused by variation of pressure in either one of said chambers from said balancing pressure ratio, the valve means being adapted thereupon to transiently vent gas from one chamber to the other in a direction adapted to restore said balancing pressure ratio and consequently to restore said diaphragms to balancing position and thereupon close the valve means.

6. The gas pressure balancing unit of the preceding claim 5 which includes a generally axially disposed backup plate in each of said high and low gas pressure chambers disposed in general juxtaposition with the respective diaphragms and joined together for movement jointly therewith, said backup plate being characterized by a little smaller perimeter than their respective diaphragms whereby the flexion of each diaphragm may occur in the portion which is located immediately radially outward from said perimeter.

7. The gas pressure balancing unit of the preceding claim 6, wherein said two-way valve means is located axially traversing said pair of flexible diaphragms and backup plates, and one of said gas chambers has axially-adjustable valve abutment means for triggering the operation of said valve means upon flexion of said diaphragms toward said abutment means.

8. The gas pressure balancing unit of the preceding claim 7, which additionally includes adjustable support means disposed approximately to balance the composite weight of the valve means and backup plates and thereby increase the sensitivity of the flexible diaphragms.

9. The gas pressure balancing unit of the preceding claim 6, wherein the backup plate in one of said chambers is shaped approximately as a cylinder which is diametrically split to form two separate but generally mating cylindrical parts, a first part of which is axially apertured and formed with an axially projecting tubular hub section jointly traversing both of said diaphragms and the other backup plate and thus extending into the other of said chambers, said hub being formed to provide a gas passage from said other chamber to an interface area located between said two split parts of the cylinder, which interface area upon axial separation of the said parts is disposed in open communication with the interior of said one chamber, the second part of which cylinder is resiliently mounted normally to sealingly close said interface area and block passage of gas into said one chamber from said other chamber, which tubular hub carries an axially disposed valve member having a projecting valve stem extending into said other chamber in position for triggered abutment with a surface therein upon flexion of said diaphragms toward said other chamber, thereby venting gas from said one chamber to the other chamber to restore balancing ratio of pressure to the two chambers, and upon opposite flexion unbalancing increase of pressure in said other chamber to unseat said second part of the cylinder from the first part and thus vent gas from said other chamber into said one chamber, thus similarly restoring balancing ratio of pressures in the two chambers.

10. The gas pressure balancing unit of the preceding claim 5, which includes a pressure limiting chamber disposed between the source of high pressure and said high pressure gas chamber, said limit chamber containing a resiliently retractable, free piston disposed to stop further flow of fluid into said high pressure gas chamber at a predetermined pressure from said source of high pressure.

11. The gas pressure balancing unit of the preceding claim 5, which is characterized by a plurality of pairs of said high and low pressure gas chambers connected in tandem, whereby the unknown high pressure thus balanced is reduced by successive predetermined area ratios of the several chambers, which ratio may be multiplied by the measurement from said low pressure gage so as to determine the unknown high pressure.

12. A device of the character described for measuring fluid pressure, comprising in combination:

body structure formed with a liquid supply chamber and with respective low and high pressure gas chambers of which the latter chambers are located adjacent to each other, with gage means disposed to register pressure of the low pressure chamber;

a pair of diaphragms each spanning a predetermined chamber area and disposed in general juxtaposition to each other, one in each of said low and high pressure chambers and forming a respective wall thereof, said diaphragms being coupled together for flexion in unison, the area spanned by the diaphragm in the low pressure chamber being a multiple of the area spanned by the diaphragm in the high pressure chamber, whereby two unequal chamber pressures of like ratio to said areas are normally balanced with said diaphragms substantially unflexed;

conduit means connecting the respective high and low pressure chambers, and normally closed valve means therealong and operable in response to movement of said coupled diaphragms caused by pressure change in either chamber, thereby to again balance the two pressures in the ratio of the two diaphragm spanned areas;

an operating piston having end faces of unequal areas, the larger area being a multiple of the smaller, the larger piston face being located within the said high pressure chamber in position to compress the volume of fluid therein upon its displacement against the balanced gas pressure initially in the chamber, and the smaller piston face being located in said liquid supply chamber disposed for application thereagainst of an unknown fluid pressure which may thus be measured by balancing it against the piston-compressed gas pressure remaining in the high pressure chamber.

13. The device of the preceding claim 12, wherein there is additionally present, composite retraction means adapted by initial application of incoming fluid pressure to said liquid supply chamber to return said operating piston to zero position immediately prior to its displacement in a compression stroke, said retraction means comprising:

a piston-like anchor member movably disposed generally parallel to the direction of movement of said operating piston, between a limited-extended and a retracted position within the body of fluid of said liquid supply chamber, an entry port of the liquid flow being located intermediate said anchor member and said operating piston whereby incoming fluid pressure therefrom exerts force against both the anchor member and the operating piston in opposite directions;

interlocking latch means secured respectively to an adjacent portion of the operating piston and to said anchor member and adapted to detachably couple the two together for joint retracted movement when the anchor member is in limited-extended position and the operating piston is disposed adjacent thereto, and associated positional means for uncoupling the same when the coupled anchor member reaches its retracted position, whereby the two upon being coupled together in anchor-extended position may be automatically uncoupled after movement by said incoming fluid pressure to said retracted position, which uncoupled retracted position corresponds to the zero position for said operating piston; and resilient means adapted normally to extend the anchor member to said limited-extended position of potential latch-engagement subsequent to displacement of the piston therefrom in a compression stroke and to which position the piston is thereafter returned by release of the compression exerting fluid pressure in the supply chamber, thereby enabling recoupling of the piston and anchor member.

14. The device of the preceding claim 13, wherein said liquid supply chamber is also provided with a free-floating piston located between a fluid entry port and said operating piston, said supply chamber being formed with intermediate limit means along its length located to block said free-floating piston at a limit position which thus lodges the same as a barrier against further application of higher fluid pressure into the device, and the internal volume of said chamber between said smaller piston face of the operating piston and said free-floating piston, is occupied by an inert liquid, whereby pressurized fluid applied to the proximate face of the free-floating piston for measurement by said device, will not contact the supply chamber beyond said limit position.

15. The device of the preceding claim 12, wherein there is additionally provided in one of the gas pressure chambers, an adjustably tensioned support arm extending from a chamber wall toward said valved conduit means which are generally axially located and which traverses and couples together said diaphragms, said support arm thus approximately balancing the composite weight of the conduit means and coupled diaphragms, thereby to increase the sensitivity of the latter in flexing in response to small changes of fluid pressure in a chamber.

16. The device of the preceding claim 12 which additionally includes indicator means for identifying the equilibrium position assumed by the displaced piston within the high pressure chamber, at which position said gage means are adapted to register the pressure in said low pressure chamber, of which low pressure the unknown fluid pressure is thus a multiple by the amount of the product of the ratio of the diaphragm spanned areas times the piston face areas ratio.

17. The device of the preceding claim 16, wherein said indicator means include at least one pinion wheel and toothed rack disposed in operative engagement, and intermediate linkage means connecting the engaged rack and pinion wheel with the operating piston and adapted to transmit longitudinal movement of the latter to the rack for actuation of the pinion wheel thereby.

18. The device of the preceding claim 17, wherein said linkage means include an adjustable leverage arm for multiplying the effective movement of the piston in transmission to the rack.

References Cited
UNITED STATES PATENTS

| 2,433,577 | 12/1947 | Poole | 73—209 |
| 3,256,740 | 6/1966 | Tate et al. | 73—388 |

LOUIS R. PRINCE, *Primary Examiner.*

D. O. WOODIEL, *Assistant Examiner.*